(12) United States Patent
Kusakabe (10) Patent No.: US 12,147,720 B2
(45) Date of Patent: Nov. 19, 2024

(54) PROCESSING APPARATUS PROVISIONED WITH MULTIPLE FUNCTIONS PURSUANT TO CONFIRMATION OF A CONTRACT AND CONTROL METHOD THEREFOR

(71) Applicant: CANON KABUSHIKI KAISHA, Tokyo (JP)

(72) Inventor: Taketoshi Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/467,227

(22) Filed: Sep. 14, 2023

(65) Prior Publication Data

US 2024/0143249 A1 May 2, 2024

(30) Foreign Application Priority Data

Oct. 27, 2022 (JP) .................. 2022-172539

(51) Int. Cl.
*G06F 3/12* (2006.01)

(52) U.S. Cl.
CPC .......... *G06F 3/1234* (2013.01); *G06F 3/1207* (2013.01); *G06F 3/1236* (2013.01); *G06F 3/1259* (2013.01)

(58) Field of Classification Search
USPC ...................................................... 358/1.14
See application file for complete search history.

(56) References Cited

U.S. PATENT DOCUMENTS

| | | | |
|---|---|---|---|
| 10,983,733 B2 | 4/2021 | Kusakabe | ................ G06F 3/12 |
| 2019/0258432 A1* | 8/2019 | Iwasaki | ................ G06F 3/1204 |
| 2021/0178772 A1* | 6/2021 | Sahara | ................ B41J 2/17506 |
| 2021/0303225 A1* | 9/2021 | Shirai | ................ H04L 41/5016 |
| 2021/0304337 A1* | 9/2021 | Shishido | ................ G06F 3/1222 |
| 2021/0306479 A1* | 9/2021 | Kajiyama | ......... H04N 1/00925 |

FOREIGN PATENT DOCUMENTS

JP 2017-047590 3/2017

* cited by examiner

*Primary Examiner* — Jacky X Zheng
(74) *Attorney, Agent, or Firm* — Venable LLP

(57) ABSTRACT

A processing apparatus capable of preventing a function corresponding to a contract from becoming unavailable due to an external factor. A communication unit has communication with an information management server to confirm a contract. A determination unit determines whether a failure factor of contract confirmation is an external factor. A controller stops providing a function corresponding to the contract in a case where the contract confirmation fails and it is determined that the failure factor of the contract confirmation is not the external factor, and provides the function corresponding to the contract in a case where the contract confirmation succeeds or a case where the confirmation of the contract fails and it is determined that the failure factor of the contract confirmation is the external factor.

13 Claims, 9 Drawing Sheets

| CONTRACT STATE / FUNCTION TYPE | FIRST STATE: VALID | SECOND STATE: INVALID | THIRD STATE: TEMPORARY VALID |
|---|---|---|---|
| FIRST FUNCTION:PRINT | AVAILABLE | UNAVAILABLE | UNAVAILABLE |
| SECOND FUNCTION: SCAN | AVAILABLE | UNAVAILABLE | AVAILABLE |
| THIRD FUNCTION:COPY | AVAILABLE | UNAVAILABLE | UNAVAILABLE |

| Information management server URL | https://check.foo.com |
|---|---|
| Simple proxy URL | https://temp.foo.com |

*FIG. 8*

| Error codes determined not to be responsible to apparatus |
|---|
| 500 Internal Server Error |
| 502 Bad Gateway |
| 503 Service Unavailable |

FIG. 9

PROCESSING APPARATUS PROVISIONED WITH MULTIPLE FUNCTIONS PURSUANT TO CONFIRMATION OF A CONTRACT AND CONTROL METHOD THEREFOR

BACKGROUND OF THE INVENTION

Field of the Invention

The present invention relates to a processing apparatus and a control method therefor.

Description of the Related Art

Many flat rate systems that provide charge systems called flat rate services or subscription services are provided with a configuration in which a device providing service communicates with an information management server managing information about a service contract. Japanese Patent Laid-Open Publication No. 2017-47590 (JP 2017-47590A) discloses a system that prevents use of service in a state where proper charge cannot be performed. This system restricts use of a function corresponding to a contact when communication connection between an image recording apparatus and an information management server cannot be continued.

However, when the information management server itself or the Internet system around the information management server is failed due to a wide-area disaster, the technique of the above-mentioned application cannot provide the communication between the image recording apparatus and the information management server until the failure is recovered. This causes a problem in which the functions corresponding to the contract are not available in the image recording apparatus, even if the contract is still in effect.

SUMMARY OF THE INVENTION

The present invention provides a processing apparatus capable of preventing a function corresponding to a contract from becoming unavailable due to an external factor, and a control method therefor.

Accordingly, an aspect of the present invention provides a processing apparatus including a communication unit configured to have communication with an information management server to confirm a contract, a determination unit configured to determine whether a failure factor of contract confirmation is an external factor, and a controller configured to stop providing a function corresponding to the contract in a case where the contract confirmation fails and it is determined that the failure factor of the contract confirmation is not the external factor, and to provide the function corresponding to the contract in a case where the contract confirmation succeeds or a case where the confirmation of the contract fails and it is determined that the failure factor of the contract confirmation is the external factor.

According to the present invention, it is possible to prevent a function corresponding to a contract from becoming unavailable due to an external factor.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Figure 1:
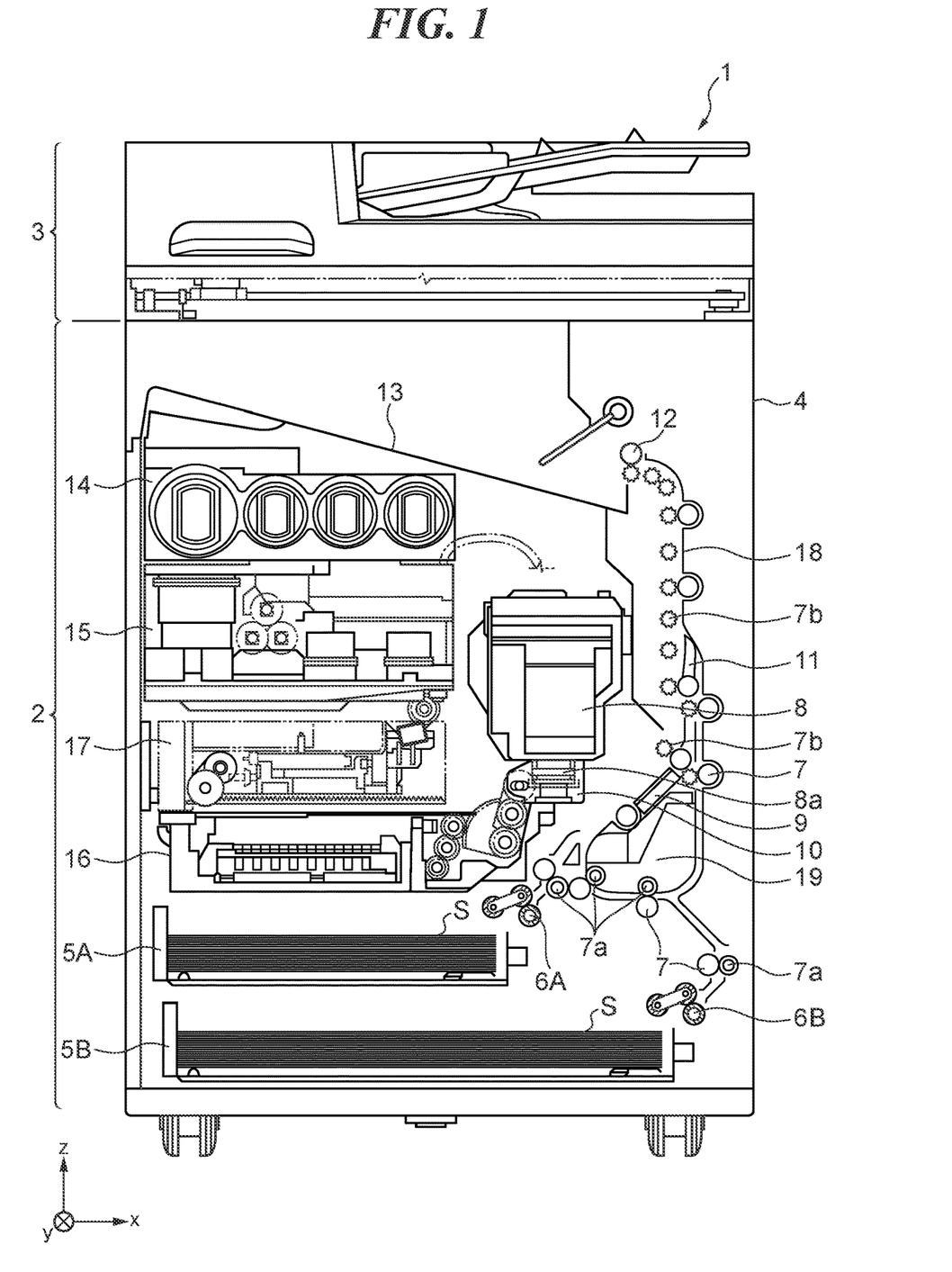
FIG. 1 is an internal configuration diagram of an inkjet recording apparatus as an image recording apparatus according to an embodiment.

FIG. 1 is an internal configuration diagram of an inkjet recording apparatus 1 as an image recording apparatus according to this embodiment. Hereinafter, the "ink jet recording apparatus 1" is simply referred to as a "recording apparatus 1". In FIG. 1, an x direction indicates a horizontal direction, a y direction (a direction perpendicular to a paper surface) indicates a direction in which discharge ports are arranged in a recording head 8 described later, and a z direction indicates a vertical direction.

The recording apparatus 1 is a multifunction peripheral including a printer unit 2 and a scanner unit 3. The recording apparatus 1 can execute various processes related to a recording operation and a reading operation by controlling the printer unit 2 and the scanner unit 3 individually or cooperatively. The scanner unit 3 includes an automatic document feeder (ADF) and a flat bed scanner (FBS). The scanner unit 3 can read a document automatically fed by the ADF and a document placed on a document table of the FBS by a user. Although a configuration in which the recording apparatus 1 includes the printer unit 2 and the scanner unit 3 will be described in this embodiment, this configuration is not limiting. For example, the recording apparatus 1 may not include the scanner unit 3. FIG. 1 shows a state where the recording apparatus 1 is in a standby state in which neither the recording operation nor the reading operation is performed.

In the printer unit 2, a first cassette 5A and a second cassette 5B for storing recording media (cut sheets) S are detachably installed in a bottom of a housing 4. In the first cassette 5A, relatively small recording media up to the A4 size are stored in flat stacking. In the second cassette 5B, relatively large recording media up to the A3 size are stored in flat stacking. In the vicinity of the first cassette 5A, a first feeding unit 5A for separating and feeding the recording media stored in the first cassette 6A one by one is provided. In the vicinity of the second cassette 5B, a second feeding unit 5B for separating and feeding the recording media stored in the second cassette 6B one by one is provided. When the recording operation is performed, the recording medium S is selectively fed from either one of the cassettes.

Conveyance rollers 7, a discharge roller 12, pinch rollers 7a, a spur 7b, a guide 18, an inner guide 19, and a flapper 11 constitute a conveyance mechanism for guiding the recording media S in a predetermined direction. The conveyance rollers 7 are driving rollers that are disposed at an upstream side of a recording head 8 and are driven by a conveyance motor (not shown). The pinch rollers 7a are driven rollers that rotates while nipping the recording medium S together with the conveyance rollers 7. The discharge roller 12 is a drive roller that is disposed on a downstream side of the recording head 8 and is driven by the conveyance motor (not shown). The spur 7b nips and conveys the recording medium S together with the discharge roller 12.

The guide 18 is provided on the conveyance path of the recording medium S and guides the recording medium S in the predetermined direction. The inner guide 19 is a member extending in the y direction and has a curved side surface, and guides the recording medium S along the side surface. The flapper 11 is a member for switching the direction in which the recording medium S is conveyed during a two-sided recording operation. A discharge tray 13 stacks and holds the recording medium S discharged by the discharge roller 12 after completion of the recording operation.

The recording head 8 is a full-line type color inkjet recording head. In the recording head 8, a plurality of ejection ports for ejecting ink in accordance with recording data are arranged in the y-direction in FIG. 1 corresponding to the width of the recording medium S. When the recording head 8 is at a standby position, an ejection port surface 8a of the recording head 8 is capped by a cap unit 10 as shown in FIG. 1. During the recording operation, the orientation of the recording head 8 is changed by a print controller 202 described later so that the ejection port surface 8a will face a platen 9. The platen 9 is configured by a flat plate extending in the y-direction and supports the recording medium S that is subjected to the recording operation by the recording head 8 from the back surface.

An ink tank unit 14 stores four color inks supplied to the recording head 8. An ink supply unit 15 is disposed on the way of a flow path connecting the ink tank unit 14 and the recording head 8, and adjusts a pressure and a flow rate of the ink in the recording head 8 within appropriate ranges. In this embodiment, a circulation type ink supply system is employed. The ink supply unit 15 adjusts the pressure of the ink supplied to the recording head 8 and the flow rate of the ink collected from the recording head 8 to be within the appropriate ranges. A maintenance unit 16 includes the cap unit 10 and a wiping unit 17, and operates the cap unit 10 and the wiping unit 17 at a predetermined timing to perform a maintenance operation to the recording head 8.

Figure 2:
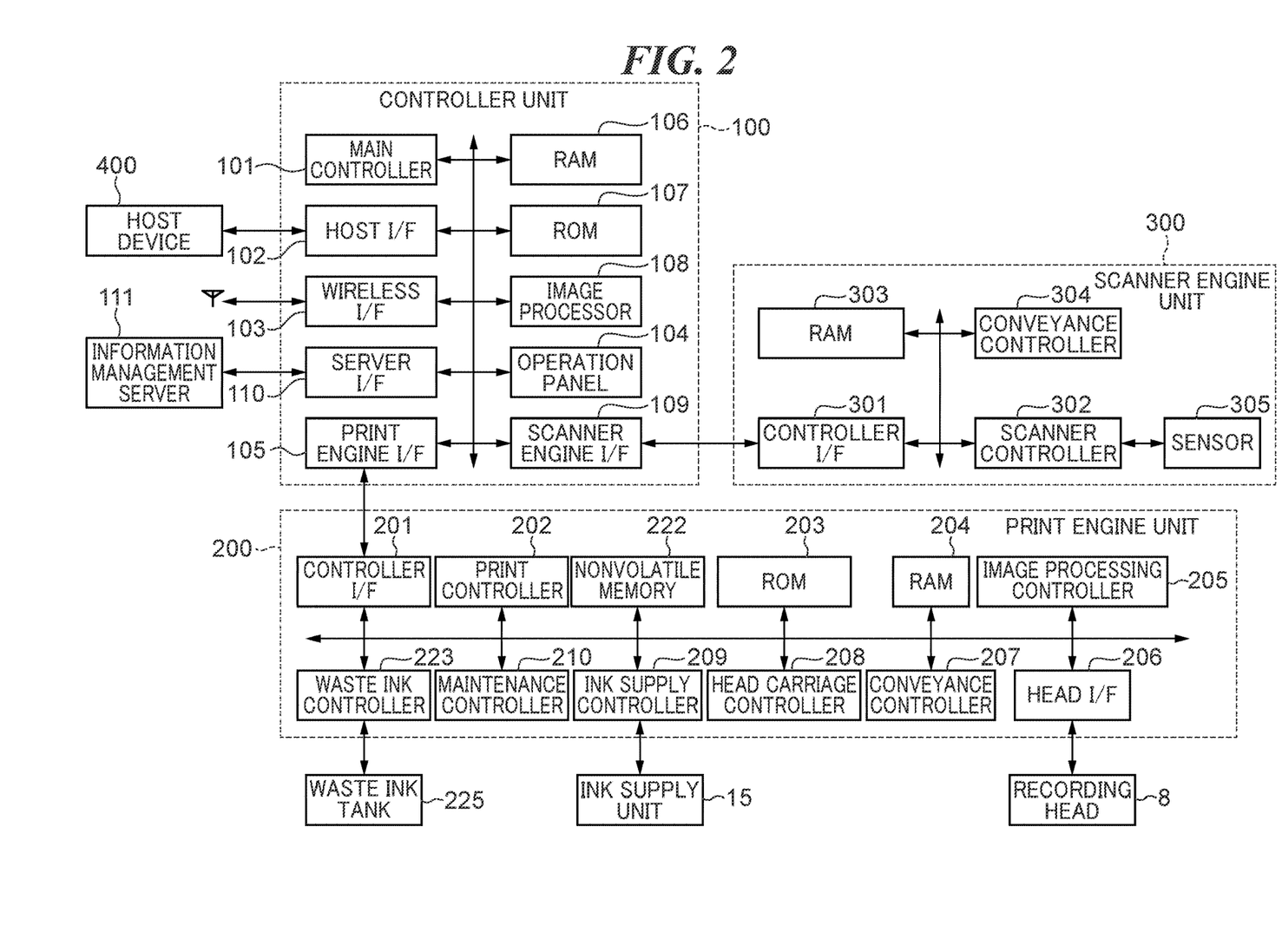
FIG. 2 is a block diagram showing a control system in the recording apparatus in FIG. 1.

FIG. 2 is a block diagram showing a control system in the recording apparatus 1 in FIG. 1. The control system mainly includes a print engine unit 200 that controls the printer unit 2, a scanner engine unit 300 that controls the scanner unit 3, and a controller unit 100 that controls the entire recording apparatus 1. A print controller 202 controls various mechanisms of the print engine unit 200 in accordance with instructions from a main controller 101 of the controller unit 100. Various mechanisms of the scanner engine unit 300 are controlled by the main controller 101 of the controller unit 100. Details of the control system will be described below.

In the controller unit 100, the main controller 101 controls the entire recording apparatus 1 using a RAM 106 as a work area in accordance with programs and various parameters stored in a ROM 107. For example, when a host OF 102 or a wireless OF 103 obtains image data from a host apparatus 400, the main controller 101 instructs an image processor 108 to perform an image process. The image processor 108 applies a predetermined image process to received image data in accordance with the instruction. Then, the main controller 101 transmits the processed image to the print engine unit 200 via a print engine I/F 105.

The recording apparatus 1 may obtain the image data from the host apparatus 400 via wireless communication or wired communication, or may obtain the image data from an external storage device (such as a USB memory) connected to the recording apparatus 1. A communication method used for wireless communication or wired communication is not limited. For example, Wi-Fi (Wireless Fidelity, registered trademark) or Bluetooth (registered trademark) is applicable as a communication method used for wireless communication. USB (Universal Serial Bus) is applicable as the communication method used for wired communication. In addition, for example, when receiving a read command from the host device 400, the main controller 101 transmits the read command to the scanner unit 3 via a scanner engine I/F 109.

An operation panel 104 is a user interface. A user can instruct operations, such as copying and scanning and can set a print mode through the operation panel 104. In addition, the user can display information about the recording apparatus 1 on the operation panel 104 to confirm the information.

In the print engine unit 200, the printer controller 202 configured by a CPU controls various mechanisms included in the printer unit 2 in accordance with programs and various parameters stored in the ROM 203 while using the RAM 204 as a work area. A nonvolatile memory 222 stores contract information as described later.

When a controller I/F 201 receives various commands and image date from the controller unit 100, the print controller 202 temporarily stores them in the RAM 204. The print controller 202 instructs an image processing controller 205 to convert image data so that the recording head 8 can use the image data for the recording operation. In accordance with the conversion instruction, the image processing controller 205 converts the image date stored in the RAM 204 into the recording date. When the image data is converted into the recording data, the print controller 202 causes the recording head 8 to execute the recording operation based on the recording data via a head OF 206. At this time, the print controller 202 controls a conveyance control unit 207 to drive the first feeding unit 5A, the second feeding unit 5B, the conveyance rollers 7, the discharge roller 12, and the flapper 11 to convey the recording medium S. A printing process is performed by executing the recording operation by the recording head 8 linked with the conveying operation of the recording medium S according to the instruction from the print controller 202.

The head carriage controller 208 changes the direction and position of the recording head 8 in accordance with operation states, such as a maintenance state and a recording state, of the recording apparatus 1. The ink supply controller 209 controls the ink supply unit 15 so that the pressure of ink supplied to the recording head 8 falls within an appropriate range. The maintenance controller 210 controls operations of the cap unit 10 and the wiping unit 17 in the maintenance unit 16 when a maintenance operation is performed on the recording head 8.

The waste ink controller 223 detects whether the ink excessively discharged in the print process and the ink discharged in the head cleaning reach the capacity of the waste ink tank 225. When the ink amount reaches the capacity, the waste ink controller 223 transmits an error code to the controller unit 100 via the controller OF 201. The main controller 101 displays a waste toner tank error on the operation panel 104 and stops the operation of the print engine unit 200.

The scanner engine unit 300 is controlled by the main controller 101. Specifically, the main controller 101 controls hardware resources of the scanner controller 302 of the scanner engine unit 300 while using the ROM 107 as a work area in accordance with programs and various parameters stored in the RAM 106. Accordingly, various mechanisms included in the scanner unit 3 are controlled.

For example, the main controller 101 controls the hardware resources in the scanner controller 302 via the controller OF 301 so that a document placed on the ADF by the user is conveyed to the sensor 305 by the conveyance controller 304. The document is read by the sensor 305. Then, the scanner controller 302 stores image data obtained by reading the document in the RAM 303. The image date is transmitted to the print engine unit 200 via the print engine OF 105. The print engine unit 200 converts the image data into print data and executes the print process using the print data.

A program for achieving one or more functions of the recording apparatus 1 or the host apparatus 400 according to this embodiment is supplied to a system or an apparatus via a network or various storage media. A computer (a CPU, an MPU, etc.) of the system or the apparatus may read the program to execute the function or cause various mechanisms to execute the function. Further, the program may be executed by one computer or may be executed by a plurality of computers in conjunction with each other. In addition, it is not necessary to achieve all of the above-described process by software, and a part or all of the process may be achieved by hardware such as an ASIC. Furthermore, the present invention is not limited to a configuration in which one CPU performs all the processes. A plurality of CPUs may perform the processes while appropriately cooperating with each other. Alternatively, a configuration where one CPU performs any process and a plurality of CPUs perform the other processes in cooperation with each other may be employed.

Available functions of the recording apparatus 1 in this embodiment are different based on whether the subscription contract is valid or invalid.

Figure 3:
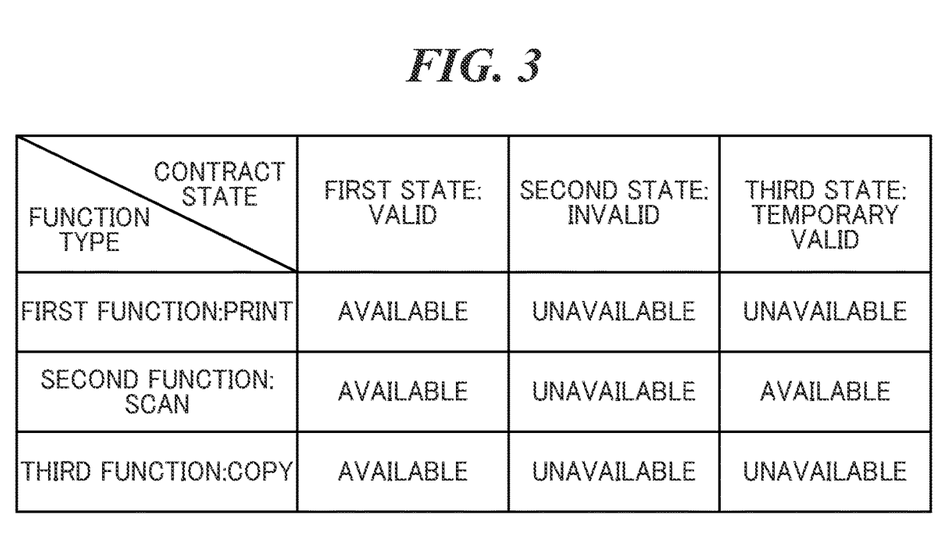
FIG. 3 is a view showing a relationship between a state of a subscription contract and functions available in the recording apparatus.

FIG. 3 is a view showing a relationship between the states of the subscription contract and the functions available on the recording apparatus 1. When the subscription contract is in a first state, i.e., valid, all the functions corresponding to the contract, specifically, a print function, a scan function, and a copy function are available in the recording apparatus 1. When the subscription contract is in a second state, i.e., invalid, all the functions corresponding to the contract, specifically, the print function, the scan function, and the copy function are unavailable in the recording apparatus 1. When the subscription contract is in a third state, i.e., temporarily valid, some functions corresponding to the contract, specifically, only the scan function among the print function, the scan function, and the copy function is available in the recording apparatus 1.

Figure 4:
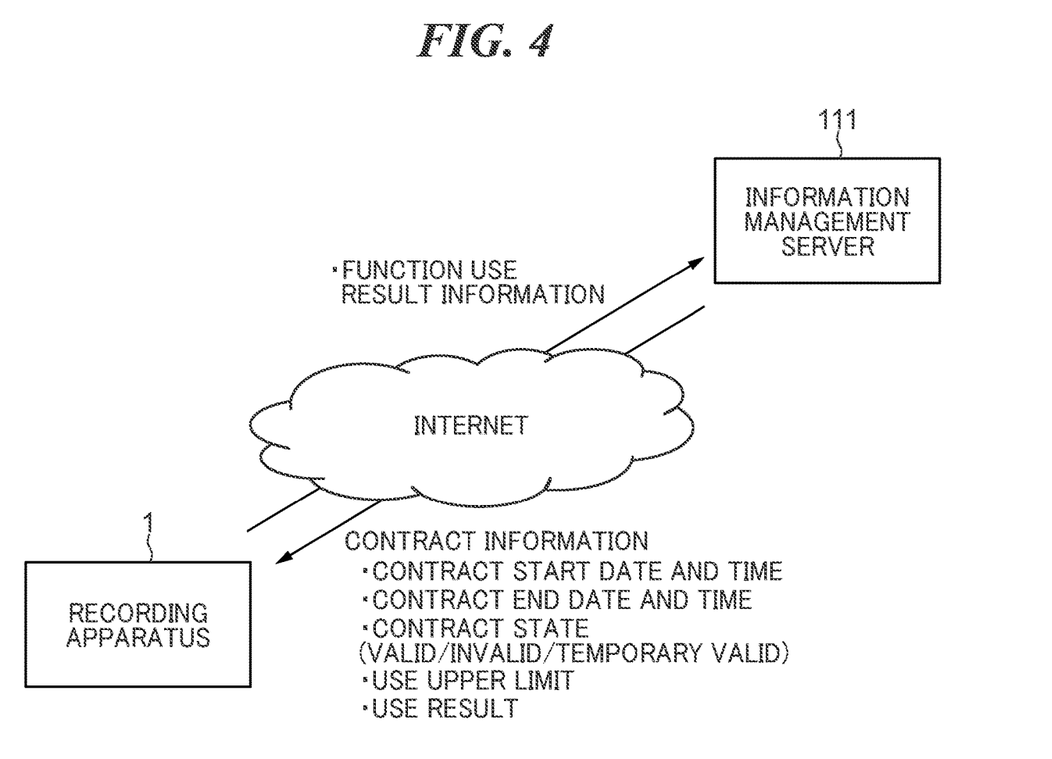
FIG. 4 is a view describing contract confirmation communication between the recording apparatus in FIG. 1 and an information management server.

FIG. 4 is a view describing contract confirmation communication performed between the recording apparatus 1 and an information management server 111. The contract confirmation communication is communication for confirming the contract. The main controller 101 of the recording apparatus 1 receives contract information from the information management server 111 via the server OF 110 in starting the recording apparatus 1 and stores the received contract information in the nonvolatile memory 222.

The contract information includes contract start date and time, contract end date and time, a contract state, a use upper limit, and a use result count value. The main controller 101 determines whether various functions, such as the print function, the scan function, and the copy function, are available based on the contract information received from the information management server 111, and notifies the user of the determination result via the operation panel 104. In addition, the main controller 101 transmits function use result information to the information management server 111 via the server OF 110 in starting the operation of the recording apparatus 1.

While the recording apparatus 1 is operating, the main controller 101 periodically receives the contract information from the information management server 111 and performs the above determination. Further, while the recording apparatus 1 is operating, the main controller 101 periodically transmits the function use result information to the information management server 111 via the server OF 110.

Figure 5:
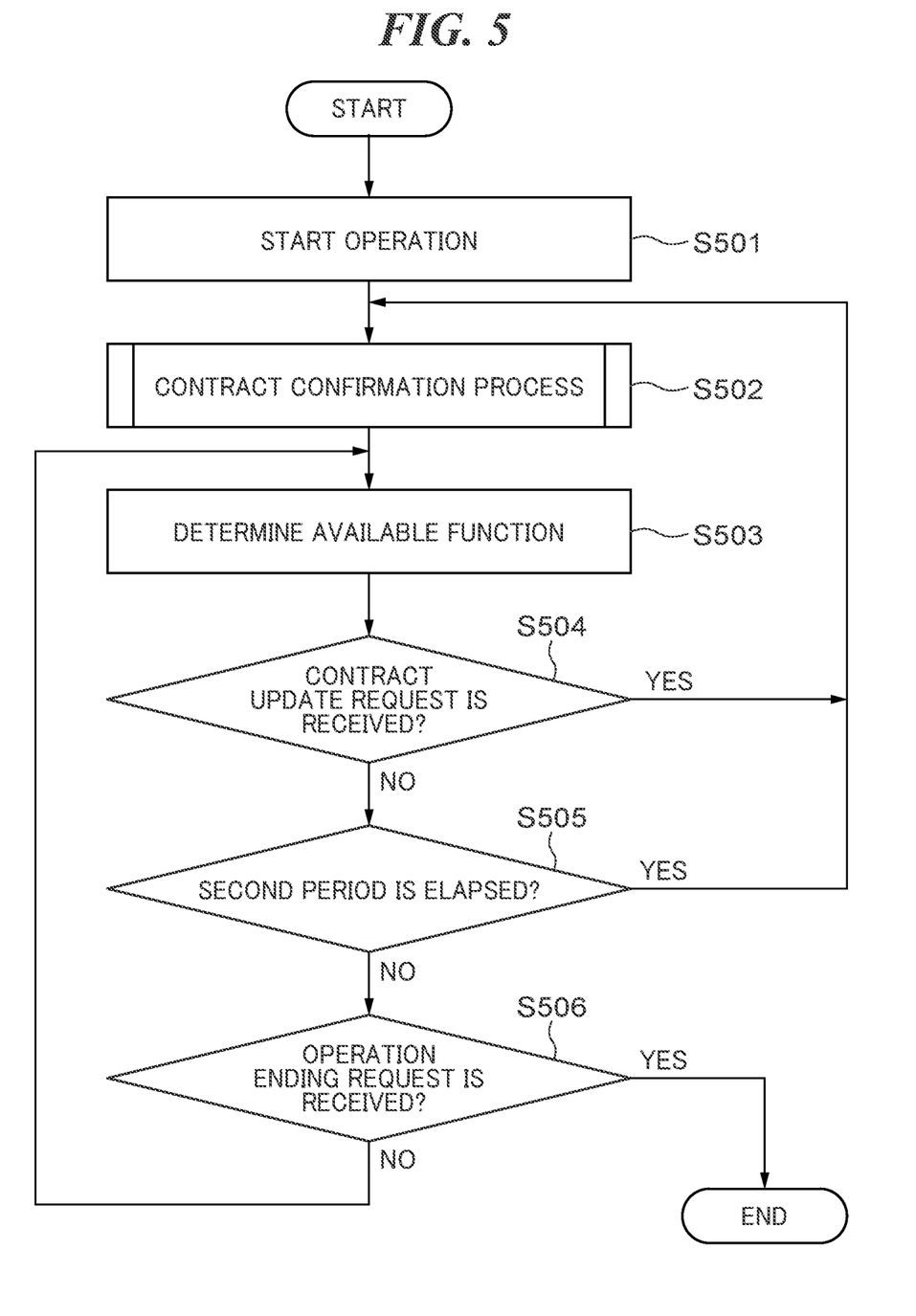
FIG. 5 is a flowchart showing a procedure of a control process performed in the recording apparatus in FIG. 1.

FIG. 5 is a flowchart showing a procedure of a control process performed in the recording apparatus 1 in FIG. 1. The control process in FIG. 5 is achieved by the main controller 101 executing a program stored in the ROM 107 etc.

The control process in FIG. 5 is executed when the main controller 101 receives an operation start request. The main controller 101 receives the operation start request, for example, when the user performs a power-on operation to turn on the recording apparatus 1, when the recording apparatus 1 returns from a sleep state to a normal operation state, or when the recording apparatus 1 returns from an error state to the normal operation state.

As shown in FIG. 5, first, the main controller 101 starts the operation in accordance with the operation start request (step S501). Next, the main controller 101 performs a contract confirmation process in FIG. 6 (step S502).

Figure 6:
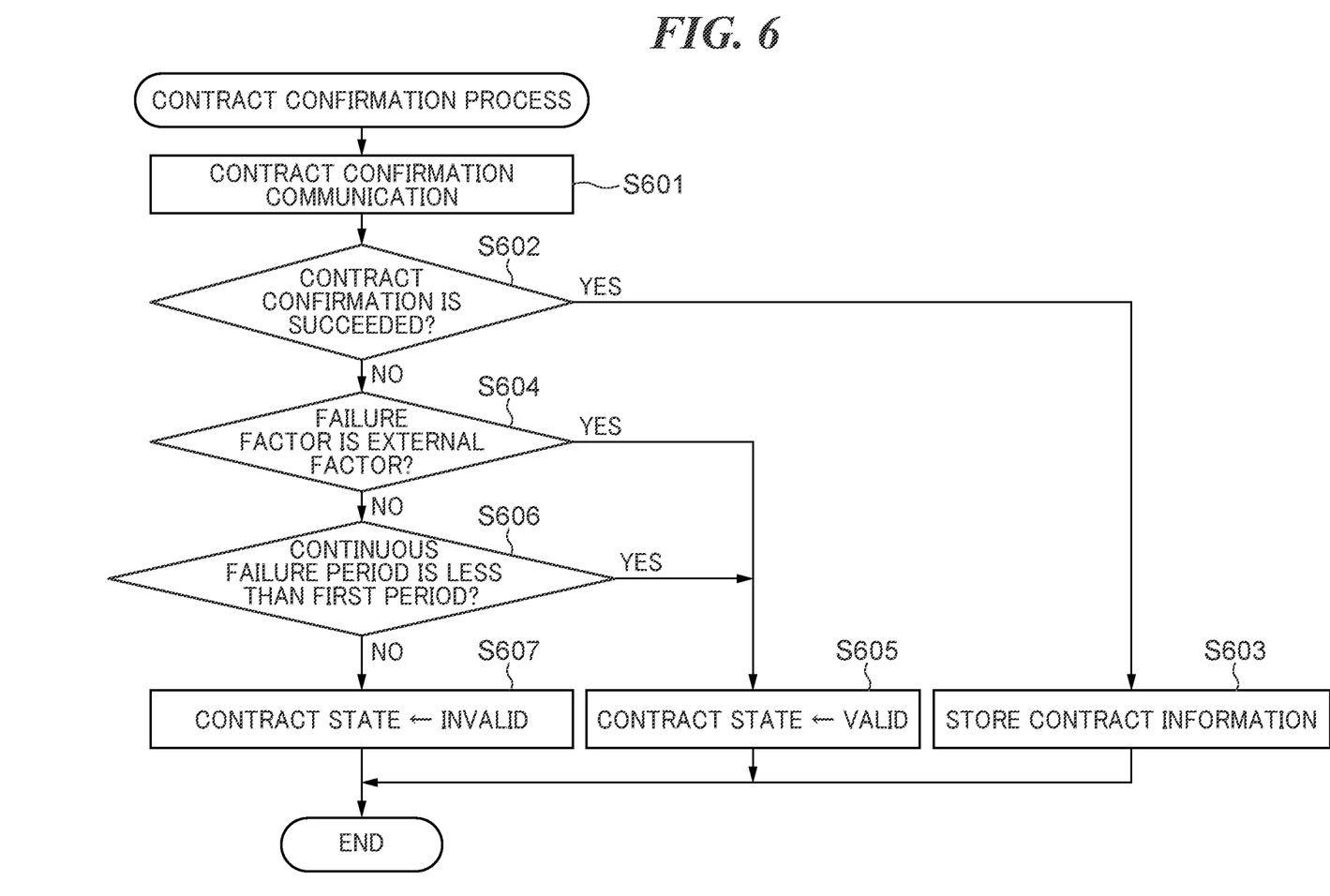
FIG. 6 is a flowchart showing a procedure of a contract confirmation process in step S502 in FIG. 5.

FIG. 6 is a flowchart showing a procedure of the contract confirmation process executed in the step S502 in FIG. 5.

As shown in FIG. 6, the main controller 101 performs the contract confirmation communication with the information management server 111 (step S601). Specifically, the main controller 101 accesses the URL (https://check.foo.com)) of the information management server 111 shown in FIG. 7 and attempts to obtain the contract information by HTTP communication. Next, the main controller 101 determines whether the contract confirmation is succeeded (step S602). In the step S602, the contract information is obtained from the information management server 111, and when the contract information is successfully authenticated, it is determined that the contract confirmation is succeeded. In the meantime, when the contract information cannot be obtained from the information management server 111, when the authentication of the contract information obtained from the information management server 111 fails, or when the contract information obtained from the information management server 111 is damaged, it is determined that the contract confirmation has failed.

When it is determined in the step S602 that the contract confirmation is succeeded, the main controller 101 stores the obtained contract information in the nonvolatile memory 222 (step S603). When the contract information has already been stored in the nonvolatile memory 222, the main controller 101 overwrites in the step S603 the contract information stored in the nonvolatile memory 222 with the contract information obtained by the contract confirmation communication in the step S601.

In the obtained contract information, "valid" may be set as the contract state, and "invalid" may be set as the contract state. Further, the main controller 101 stores information about the date and time in performing the determination in the step S602 in the nonvolatile memory 222 as contract confirmation date and time. Thereafter, the contract confirmation process ends, and the process proceeds to step S503 in FIG. 5.

When it is determined in the step S602 that the contract confirmation has failed, the main controller 101 determines whether a failure factor of the contract confirmation is an external factor (step S604). In the step S604, it is determined whether the failure factor of the contract confirmation is an external factor based on the error code of the HTTP communication. When the error code of the HTTP communication is a predetermined error code indicating that the error is caused by an external device, it is determined that the failure factor of the contract confirmation is the external factor.

Figure 8:
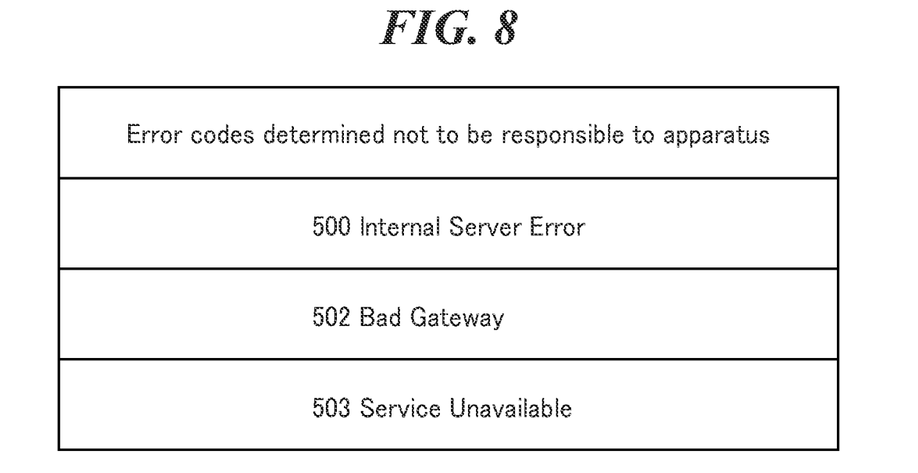
FIG. 8 is a view showing examples of predetermined error codes in this embodiment.

The predetermined error code is, for example, "500 Internal Server Error", "502 Bad Gateway", or "503 Service Unavailable" as shown in FIG. 8. The "500 Internal Server Error" is an error code output when an internal error occurs in the information management server 111. The "502 Bad Gateway" is an error code output when a network error occurs between the information management server 111 and another server. The "503 Service Unavailable" is an error code output when the information management server 111 is in an inaccessible state. The inaccessible state is, for example, a state in which access to the Web site provided by the information management server 111 is concentrated and a high load is imposed on the information management server 111, or a maintenance state of the information management server 111.

In the meantime, when the error code of the HTTP communication is not the predetermined error code, it cannot be determined that the failure factor of the contract confirmation is the external factor, and thus it is determined that the failure factor of the contract confirmation is not the external factor. In addition, when the authentication of the contract information obtained from the information management server 111 fails or when the contract information obtained from the information management server 111 is damaged, since it cannot be determined that the failure factor of the contract confirmation is the external factor, it is determined that the failure factor of the contract confirmation is not the external factor.

When it is determined in the step S604 that the failure factor of the contract confirmation is the external factor, the main controller 101 sets the contract state to valid (step S605). Accordingly, the recording apparatus 1 provides the functions corresponding to the contract, specifically, the print function, the scan function, and the copy function. This set value is stored in the nonvolatile memory 222. Further, the main controller 101 stores information about the date and time in performing the determination in the step S602 in the nonvolatile memory 222 as the contract confirmation date and time. Thereafter, the contract confirmation processing ends, and the process proceeds to the step S503 in FIG. 5.

When it is determined in the step S604 that the failure factor of the contract confirmation is not the external factor, the main controller 101 determines whether a period during which the contract confirmation continues to fail (hereinafter referred to as a "continuous failure period") is less than a first period (step S606). The determination in the step S606 is performed based on the contract confirmation date and time stored in the nonvolatile memory 222, for example. The first period is, for example, 15 days.

When it is determined in the step S606 that the continuous failure period is less than the first period, the process proceeds to the step S605. As described above, in this embodiment, even when it is determined that the failure factor of the contract confirmation is not the external factor, when it is determined that the continuous failure period is less than the first period, all of the print function, the scan function, and the copy function are available in the recording apparatus 1. In the meantime, when it is determined in the step S606 that the continuous failure period is equal to or more than the first period, the process proceeds to step S607.

In the step S607, the main controller 101 sets the contract state to invalid. Accordingly, the recording apparatus 1 stops providing the functions corresponding to the contract, specifically, the print function, the scan function, and the copy function. This set value is also stored in the nonvolatile memory 222. Further, the main controller 101 stores information about the date and time in performing the determination in the step S602 in the nonvolatile memory 222 as the contract confirmation date and time. Thereafter, the contract confirmation process ends, and the process proceeds to the step S503 in FIG. 5.

Returning to FIG. 5, in the step S503, the main controller 101 determines the available functions. For example, when the contract information is obtained from the information management server 111 in the step S502, the available functions are determined based on the contract state and the use upper limit included in the contract information. Specifically, when the contract state included in the contract information is "valid" and the function use record does not reach the use upper limit, the print function, the scan function, and the copy function are determined to be available functions. If there is an unavailable function, the user is notified of the reason via the operation panel 104. The user is notified of the information about the use upper limit of the function and the information about the use result of the function via the operation panel 104.

Next, the main controller 101 determines whether a contract update request for updating the subscription contract of the recording apparatus 1 has been received (step S504). A subscription contractor of the recording apparatus 1 can perform a contract update procedure at an arbitrary timing through a contract update screen displayed on the operation panel 104.

When a predetermined operation corresponding to the update request is received by the operation panel 104, the main controller 101 determines that the update request of the subscription contract of the recording apparatus 1 is received. In the meantime, when the predetermined operation corresponding to the update request is not received through the operation panel 104, the main controller 101 determines that the update request of the subscription contract of the recording apparatus 1 is not received.

When it is determined in the step S504 that the update request for the subscription contract of the recording device 1 is received, the processing returns to the step S502. When it is determined in the step S504 that the update request for the subscription contract of the recording apparatus 1 is not received, the process proceeds to step S505.

In the step S505, the main controller 101 determines whether a second period is elapsed since the contract confirmation communication was performed. The determination in the step S505 is performed by using, for example, the contract confirmation date and time. The second period is, for example, 7 days. When it is determined in the step S505 that the second period is elapsed since the contract confirmation communication was performed, the process returns to the step S502. When it is determined in the step S505 that the second period is not elapsed since the contract confirmation communication was performed, the process proceeds to step S506.

In the step S506, the main controller 101 determines whether an operation end request is received. The main controller 101 receives the operation end request, for example, when the user performs a power OFF operation for stopping the supply of power to the printing apparatus 1 or when the printing apparatus 1 transitions from the normal operation state to the sleep state. The main controller 101 also receives the operation end request when the printing apparatus 1 interrupts the process due to occurrence of an error.

When it is determined in the step S506 that the operation end request is not received, the process returns to the step S503. In the meantime, when it is determined in the step S506 that the operation end request is received, the process ends.

According to the above-described embodiment, the functions corresponding to the contract is provided in the case where the content confirmation fails and it is determined that the failure factor of the contract confirmation is the external factor. This can prevent the functions corresponding to the contract from becoming unavailable due to the external factor.

Further, in the above-described embodiment, it is determined that the failure factor of the contract confirmation is the external factor when the error code of the HTTP communication is the predetermined error code indicating that the error is caused by the external device. This can prevent the function corresponding to the contract from becoming unavailable due to a communication error caused by the external device.

In the above-described embodiment, the predetermined error code is the error code output when an internal error occurs in the information management server 111. This can prevent the function corresponding to the contract from becoming unavailable when the internal error occurs in the information management server 111.

In the above-described embodiment, the predetermined error code is an error code output when a network error occurs between the information management server 111 and another server. This can prevent the function corresponding to the contract from becoming unavailable when the network error occurs between the information management server 111 and another server.

In the above-described embodiment, the predetermined error code is an error code output when the information management server 111 is in the inaccessible state. This can prevent the function corresponding to the contract from becoming unavailable when the information management server 111 is in the inaccessible state.

Although the present invention has been described using the above-described embodiments, the present invention is not limited to the above-described embodiments. For example, when the contract confirmation fails and it is determined that the failure factor of the contract confirmation is the external factor, the provider of the service corresponding to the contract may be notified that the function corresponding to the contract is provided. As a result, the service provider can grasp that the contract confirmation is failed due to a factor other than the recording apparatus 1 and that the function corresponding to the contract is provided even if the contract confirmation is failed.

In addition, in this embodiment, the determination in the step S604 may use a communication result with a communication apparatus other than the information management server 111 instead of the error code of the HTTP communication.

Figure 7:
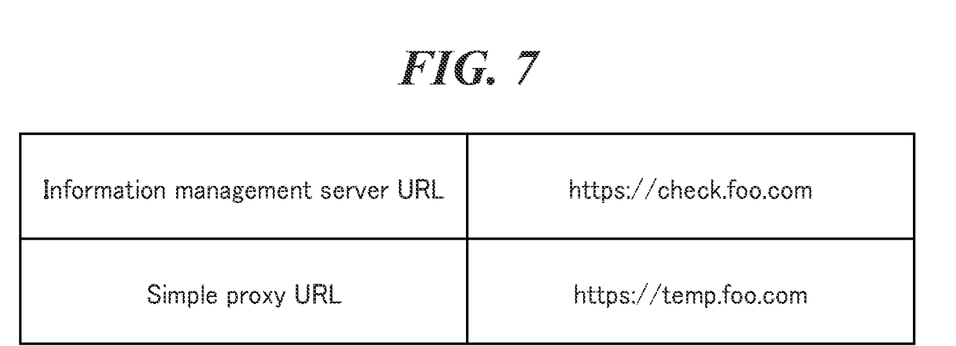
FIG. 7 is a view showing examples of URLs of the information management server in this embodiment.

For example, in the step S604, the main controller 101 accesses URL (https://temp.foo.com)) of the other communication apparatus shown in FIG. 7. The other communication apparatus does not have the function of managing the contract information that the information management server 111 has, and the contract information transmitted from the other communication apparatus is dummy information. If the recording apparatus 1 successfully obtain the contract information (dummy information) from the other communication apparatus, the recording apparatus 1 is communicable, and thus it is determined in the step S604 that the failure factor of the contract confirmation is an external factor.

In the meantime, when the recording apparatus 1 fails to obtain the contract information (dummy information) from the other communication apparatus, the recording apparatus 1 is unable to communicate. Therefore, it is determined in the step S604 that the failure factor of the contract confirmation is not an external factor. As described above, when the contract confirmation fails and the recording apparatus 1 succeeds in communication with the other communication apparatus different from the information management server 111, it is determined that the failure factor of the contract confirmation is an external factor. When the contract confirmation fails and the recording apparatus 1 fails to communicate with the other communication apparatus, it is determined that the failure factor of the contract confirmation is not an external factor. This can prevent the function corresponding to the contract from becoming unavailable even when the recording apparatus 1 is communicable.

In this embodiment, the URL of the other communication apparatus is set to the same domain as the URL of the information management server 111, but the URL of the other communication apparatus is not limited thereto. For example, a URL (for example, http://bar.com) that is open to the public independent of the flat-rate system under the subscription contract may be accessed by the GET method. This cannot confirm encryption of a communication path an operation of a login process for the contract confirmation that the information management server 111 can confirm, but can confirm that there is no problem in the communication between the recording apparatus 1 and the Internet.

In addition, in this embodiment, when the contract confirmation fails and the failure factor is not an external factor, the provision of the service corresponding to the contract may be stopped. In addition, only service more limited than the contracted service may be provided. For example, the service defined by the subscription contract shall allow printing of 200 sheets per month. In such a case, if the contraction confirmation fails and if the failure factor is not an external factor, the print service of 200 sheets per month is stopped. However, a limited service that allows the print service of only 10 sheets per month may be provided. In this case, there is an advantage that the user can receive the minimum print service when there is a document that the user urgently wants to print. When the contract confirmation is succeeded or when the failure factor is an external factor even if the contract confirmation fails, the print service of 200 sheets per month is provided.

Also, in this embodiment, when the contract confirmation fails, a part of the functions corresponding to the contract may be provided.

Figure 9:
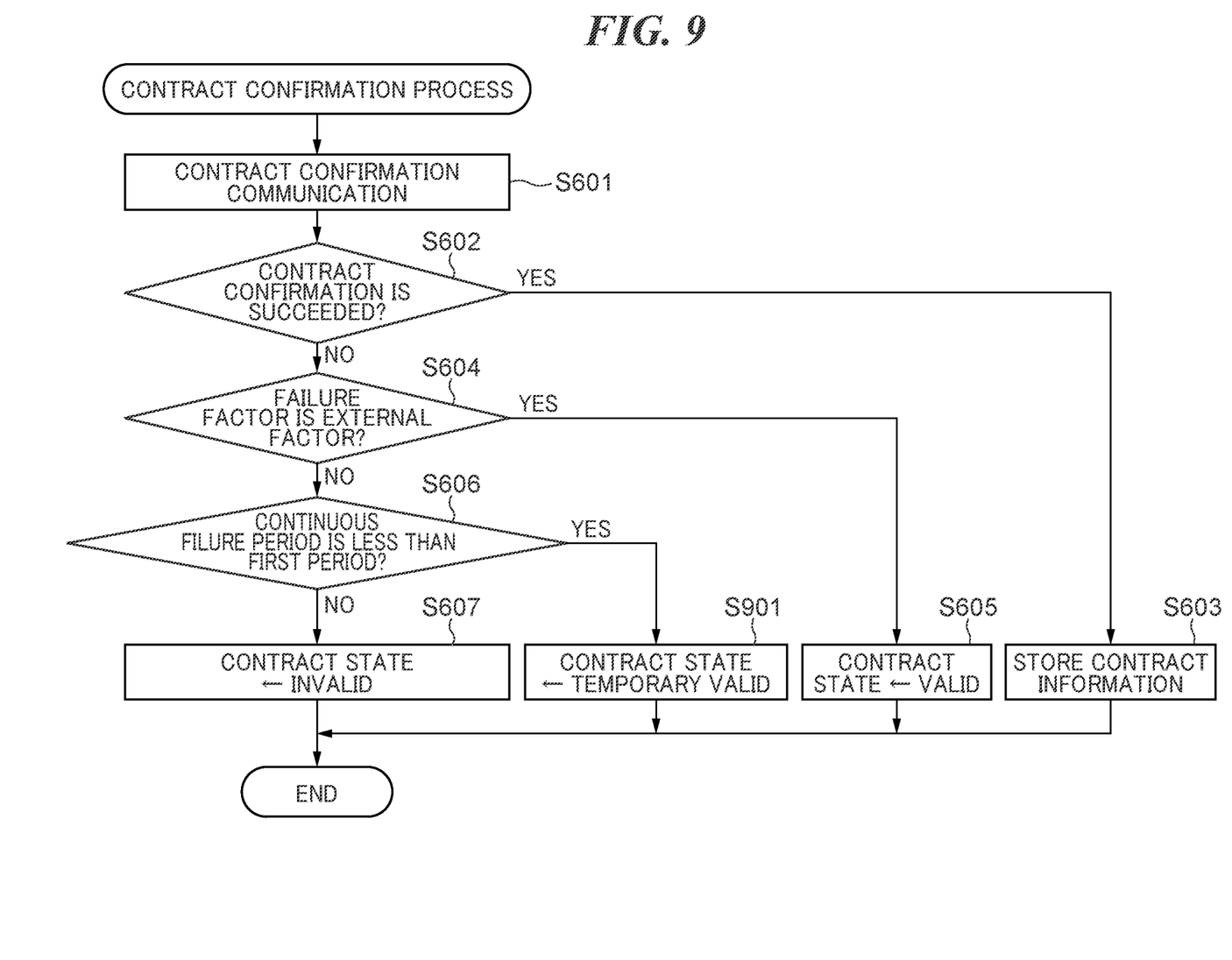
FIG. 9 is a flowchart showing another procedure of the contract confirmation process in the step S502 in FIG. 5.

FIG. 9 is a flowchart showing another procedure of the contract confirmation process in the step S502 in FIG. 5. The contract confirmation process in FIG. 9 is similar to the contract confirmation process in FIG. 6, and hereinafter, contents different from those of the contract confirmation process in FIG. 6 will be particularly described.

In FIG. 9, the processes in the steps S601 to S606 described above are performed. When it is determined in the step S606 that the continuous failure period is equal to or more than the first period, the process proceeds to the step S607. When it is determined in the step S606 that the continuous failure period is less than the first period, the process proceeds to step S901.

In the step S901, the main controller 101 sets the contract state to temporary valid. As a result, the recording apparatus 1 provides a part of the functions corresponding to the contract, specifically, provides the scan function from among the print function, the scan function, and the copy function. This set value is also stored in the nonvolatile memory 222. Further, the main controller 101 stores information about the date and time in performing the determination in the step S602 in the nonvolatile memory 222 as the contract confirmation date and time. Thereafter, the contract confirmation process ends, and the process proceeds to the step S503 in FIG. 5.

In the above-described embodiment, the part of the functions corresponding to the contract is provided when the continuous failure period is less than the first period even when it is determined that the failure factor of the contract confirmation is not an external factor. This allows the user to use the part of the functions corresponding to the contract when the contract confirmation fails due to a factor other than the external factor.

Although the image recording apparatus has been described as an example of the processing apparatus in the above-described embodiment, the processing apparatus of the present invention is not limited to the image recording apparatus. The present invention can be widely applied to a processing apparatus having a controller that confirms a contract with an information management server and controls a processor so as to provide functions corresponding to the contract when contract confirmation is succeeded.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-172539, filed Oct. 27, 2022, which is hereby incorporated by reference herein in its entirety.

What is claimed is:

1. A processing apparatus in which a plurality of functions including a first function, a second function, and a third function are providable, the processing apparatus comprising:
one or more circuits; or
one or more processors and at least one memory, the at least one memory being coupled to the one or more processors and having stored thereon instructions executable by the one or more processors,
wherein at least one of the one or more circuits or the execution of the instructions by the one or more processors cause the processing apparatus to function as:
a communication unit configured to have communication with an information management server to confirm a contract;
a determination unit configured to determine whether a failure factor of contract confirmation is an external factor; and
a controller configured to, in a case where the contract confirmation fails and it is determined that the failure factor of the contract confirmation is not the external factor:
stop providing the first function, the second function, and the third function, when a period during which the contract confirmation continues to fail is equal to or more than a predetermined period, and
stop providing the first function and the third function and provide the second function, when the period during which the contract confirmation continues to fail is less than the predetermined period.

2. The processing apparatus according to claim 1, wherein the determination unit determines that the failure factor of the contract confirmation is the external factor in a case where an error code of the communication is a predetermined error code indicating an error caused by an external device.

3. The processing apparatus according to claim 2, wherein the predetermined error code is output when an internal error occurs in the information management server.

4. The processing apparatus according to claim 2, wherein the predetermined error code is output when a network error occurs between the information management server and another server.

5. The processing apparatus according to claim 2, wherein the predetermined error code is output when the information management server is in an inaccessible state.

6. The processing apparatus according to claim 1, wherein the determination unit determines that the failure factor of the contract confirmation is the external factor in a case where the contract confirmation fails and the processing apparatus succeeds in communication with another communication apparatus different from the information management server, and
wherein the determination unit determines that the failure factor of the contract confirmation is not the external factor in a case where the contract confirmation fails and the processing device fails to communicate with the other communication apparatus.

7. The processing apparatus according to claim 1, wherein the first function is a print function, the second function is a scan function, and the third function is a copy function.

8. The processing apparatus according to claim 1, wherein the controller is configured to provide the first function, the second function, and the third function, in a case where the contract confirmation succeeds or a case where the confirmation of the contract fails and it is determined that the failure factor of the contract confirmation is the external factor.

9. The processing apparatus according to claim 8, wherein said at least one of the one or more circuits or the execution of the instructions by the one or more processors further cause the processing apparatus to function as a notification unit configured to notify a provider of service corresponding to the contract that the first function, the second function, and the third function are provided in the case where the contract confirmation fails and it is determined that the failure factor of the contract confirmation is the external factor.

10. The processing apparatus according to claim 1, wherein the communication unit is configured to attempt to have communication with a server which is different from the information management server, and the determination unit is configured to determine that the failure factor of the contract confirmation is the external factor in a case where the communication with the server is available and the communication with the information management server is not available.

11. The processing apparatus according to claim 1, wherein the contract involves a consumable of the processing apparatus, and wherein execution of the first function and the third function consume the consumable whereas execution of the second function does not consume the consumable.

12. A control method for a processing apparatus in which a plurality of functions including a first function, a second function, and a third function are providable, the control method comprising:
having communication with an information management server to confirm a contract;
determining whether a failure factor of contract verification is an external factor;
controlling the plurality of functions in a case where the contract confirmation fails and it is determined that the failure factor of the contract confirmation is not the external factor, including:
stopping providing the first function, the second function, and the third function, when a period during which the contract confirmation continues to fail is equal to or more than a predetermined period; and
stopping providing the first function and the third function and providing the second function, when the period during which the contract confirmation continues to fail is less than the predetermined period.

13. A processing apparatus comprising:
one or more circuits; or
one or more processors and at least one memory, the at least one memory being coupled to the one or more processors and having stored thereon instructions executable by the one or more processors,
wherein at least one of the one or more circuits or the execution of the instructions by the one or more processors cause the processing apparatus to function as:
a communication unit configured to communicate with an information management server to confirm a contract;
a determination unit configured to determine whether a failure factor of the contract confirmation is an external factor; and
a controller configured to, in a case where the contract confirmation fails and it is determined that the failure factor of the contract confirmation is not the external factor:
stop providing service corresponding to the contract, when a period during which the contract confirmation continues to fail is equal to or more than a predetermined period, and
provide service more limited than the service corresponding to the contract, when the period during which the contract confirmation continues to fail is less than the predetermined period.

* * * * *